(12) United States Patent
Oh et al.

(10) Patent No.: US 11,590,955 B2
(45) Date of Patent: Feb. 28, 2023

(54) ELECTRONIC BRAKE-INTEGRATED IN-WHEEL MOTOR DRIVING DEVICE

(71) Applicant: LG ELECTRONICS INC., Seoul (KR)

(72) Inventors: Seung-Suk Oh, Seoul (KR); Dosun Kim, Seoul (KR); Hyojin Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 327 days.

(21) Appl. No.: 16/957,019

(22) PCT Filed: Mar. 7, 2019

(86) PCT No.: PCT/KR2019/002687
§ 371 (c)(1),
(2) Date: Jun. 22, 2020

(87) PCT Pub. No.: WO2019/172697
PCT Pub. Date: Sep. 12, 2019

(65) Prior Publication Data
US 2020/0391719 A1    Dec. 17, 2020

(30) Foreign Application Priority Data
Mar. 9, 2018 (KR) .................. 10-2018-0027802

(51) Int. Cl.
*B60T 13/74* (2006.01)
*B60T 1/06* (2006.01)
*F16D 65/18* (2006.01)

(52) U.S. Cl.
CPC .............. *B60T 13/748* (2013.01); *B60T 1/06* (2013.01); *F16D 65/186* (2013.01); *B60Y 2200/84* (2013.01)

(58) Field of Classification Search
CPC ........ B60T 13/748; B60T 1/06; F16D 65/186; B60Y 2200/84
See application file for complete search history.

(56) References Cited

U.S. PATENT DOCUMENTS

| 2012/0001521 A1 | 1/2012 | Shiraki et al. |
| 2012/0083375 A1* | 4/2012 | Lo .................. B60K 7/0007 475/149 |
| 2019/0106096 A1* | 4/2019 | Tang ................ F16D 63/006 |

FOREIGN PATENT DOCUMENTS

| CN | 107539413 A | 1/2018 |
| GB | 2345586 A | 7/2000 |

(Continued)

OTHER PUBLICATIONS

International Search Report from PCT/KR2019/002687, dated Jun. 5, 2019.

(Continued)

*Primary Examiner* — Vishal R Sahni
(74) *Attorney, Agent, or Firm* — Dentons US LLP

(57) ABSTRACT

The present invention relates to an electronic braked-integrated in-wheel motor driving device. According to one embodiment of the present invention, an apparently complicated driving device structure, which is formed due to the installation of a brake, can be avoided, and a product appearance of a wheel-chair, to which the in-wheel motor driving device is applied, can be simplified, whereby the driving device improves the visual appearance as well as the brake function and can thus enhance production competitiveness.

17 Claims, 6 Drawing Sheets

(56) References Cited

FOREIGN PATENT DOCUMENTS

| | | |
|---|---|---|
| JP | 03-011299 U | 2/1991 |
| JP | 09-109696 A | 4/1997 |
| JP | 2544330 Y2 | 8/1997 |
| JP | 2002-321665 A | 11/2002 |
| JP | 2012-030786 A | 2/2012 |
| KR | 10-2008-0034090 A | 4/2008 |
| KR | 10-1792434 B1 | 11/2017 |

OTHER PUBLICATIONS

Search Report of European Patent Office in Appl'n No. 19764452.9, dated Jul. 19, 2021.

* cited by examiner

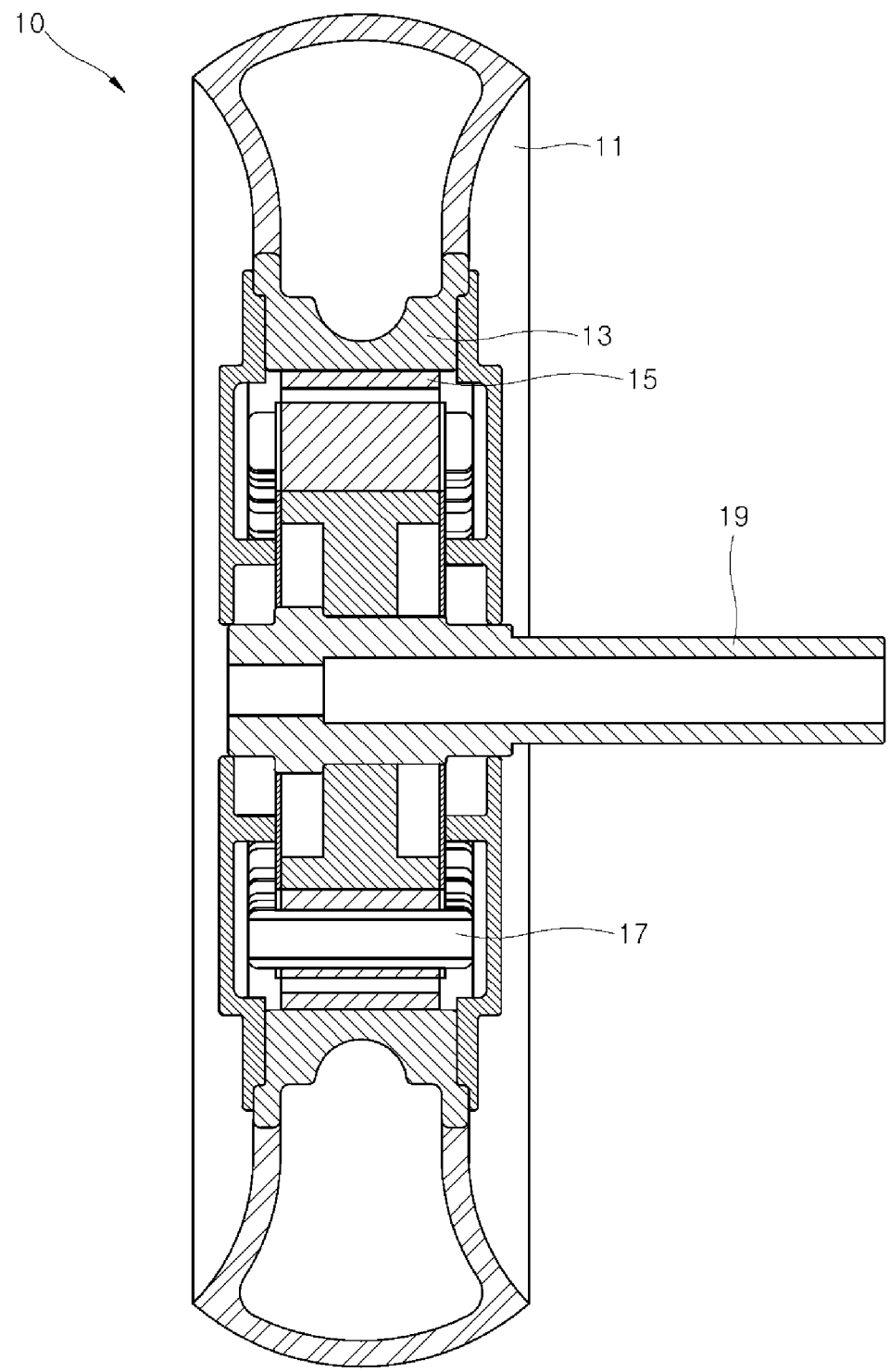
[FIG. 1]

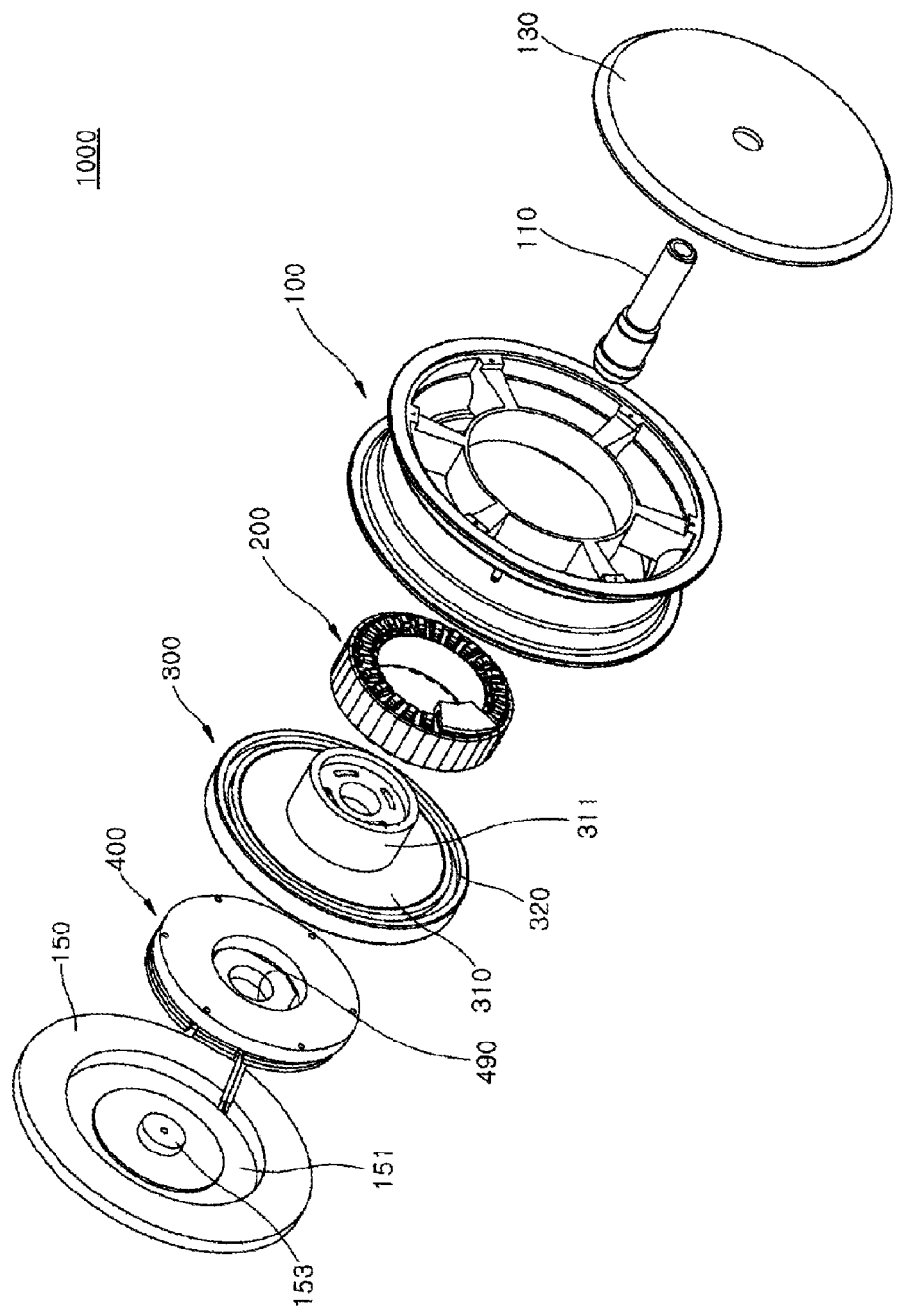
[FIG. 2]

[FIG. 3]
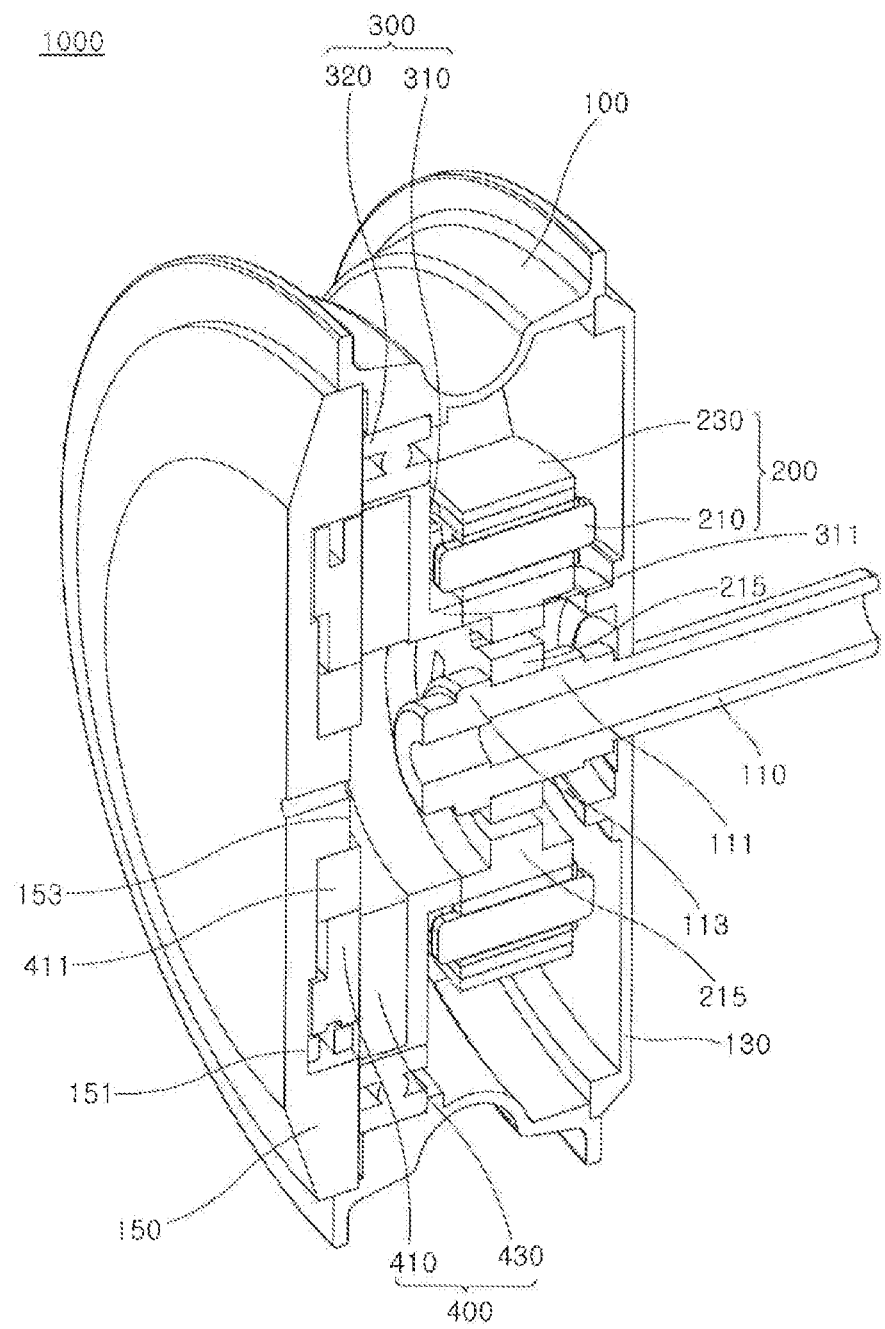

[FIG. 4]
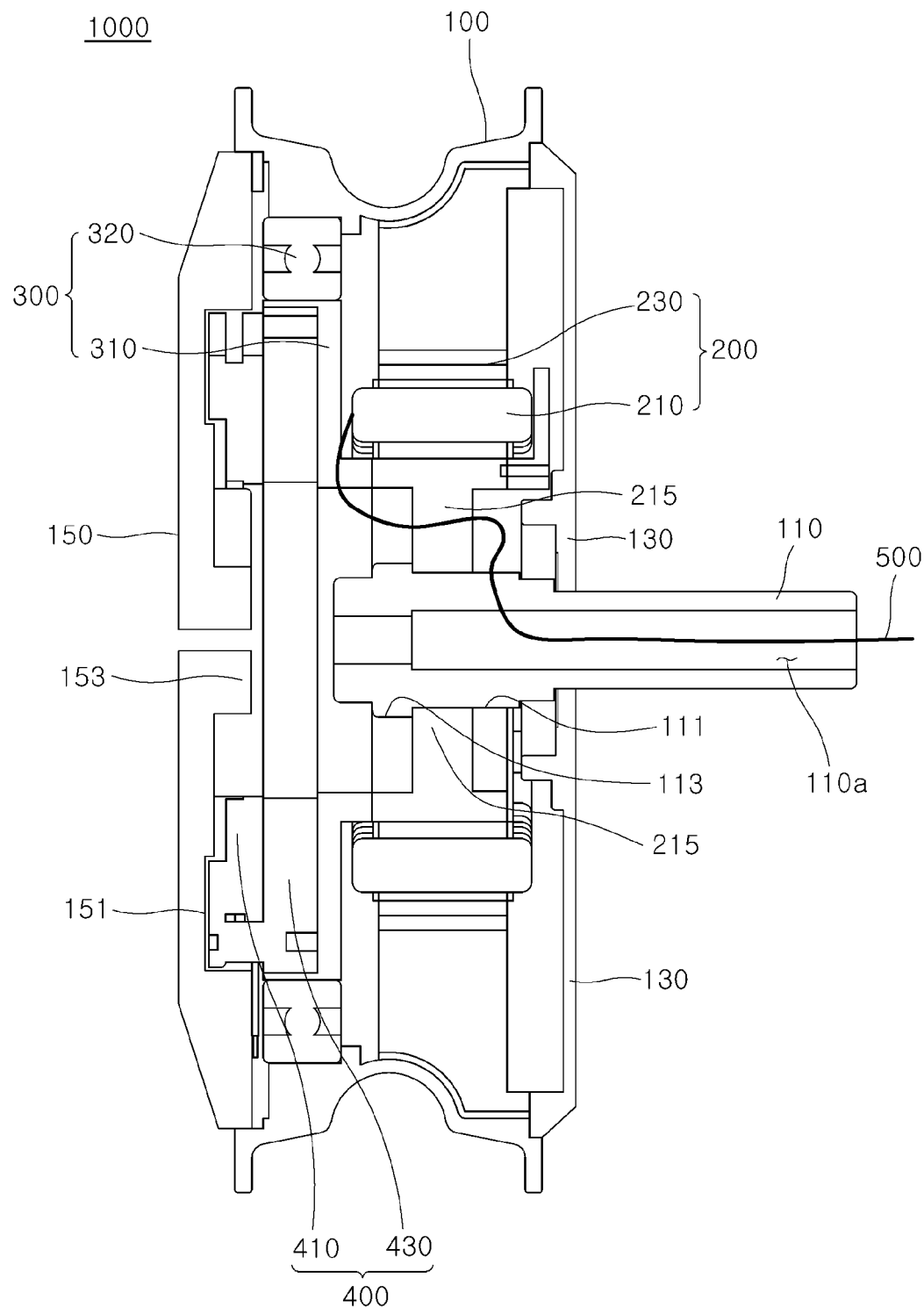

[FIG. 5]
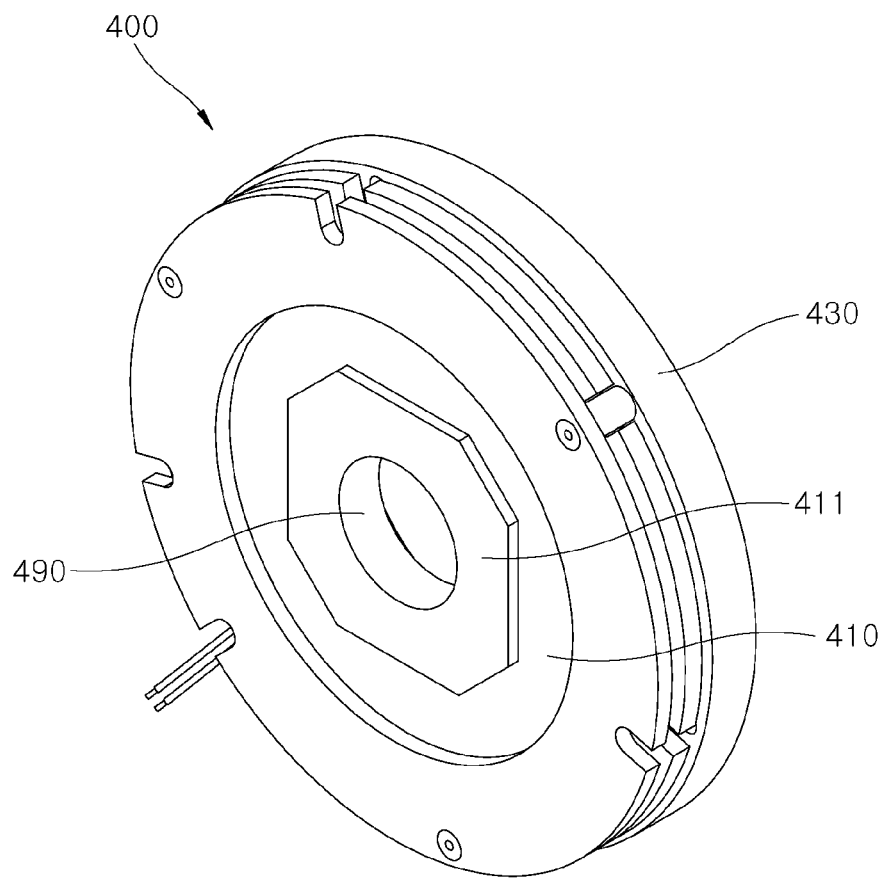

[FIG. 6]
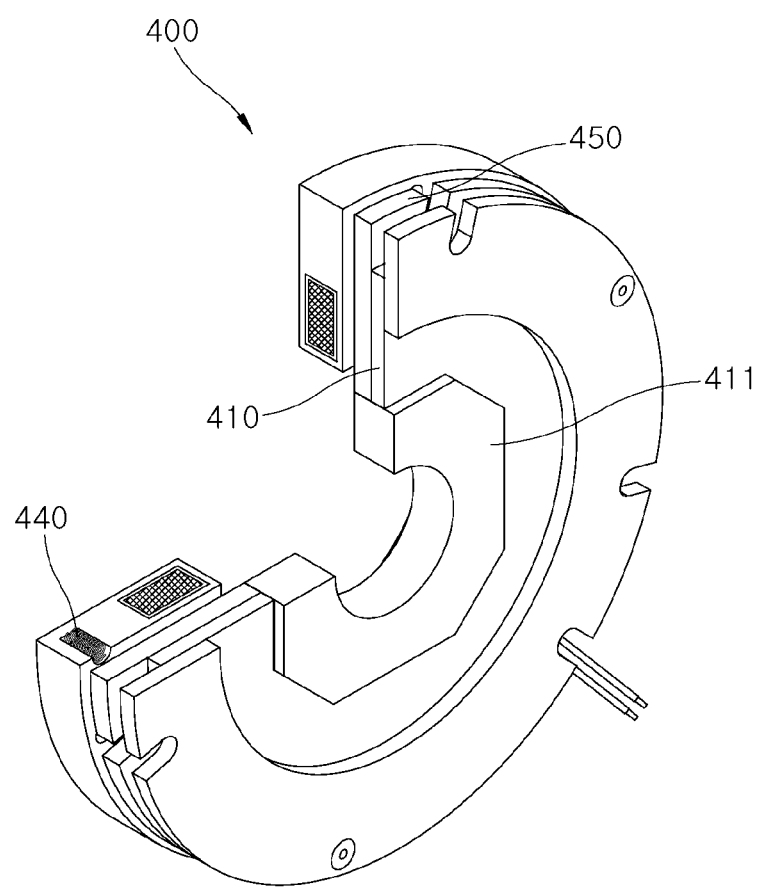

US 11,590,955 B2

ELECTRONIC BRAKE-INTEGRATED IN-WHEEL MOTOR DRIVING DEVICE

This application is a National Stage Application of International Application No. PCT/KR2019/002687, filed on Mar. 7, 2019, which claims priority to Korean Patent Application No. 10-2018-0027802 filed on Mar. 9, 2018, all of which are hereby incorporated by reference in their entirety for all purposes as if fully set forth herein.

TECHNICAL TITLE

The present disclosure relates to an electronic brake-integrated in-wheel motor driving device that can ensure a simplified structure of a wheel chair by inserting an electronic brake therein and that can prevent the wheel chair from moving backwards when the wheel chair comes to a halt on a slope.

BACKGROUND ART

In-wheel motors are a system used for transportation means powered by electricity. In the system, power output from a motor disposed in a rim is directly delivered to a wheel.

In case the in-wheel motor is applied to a transportation device, devices for driving and delivering power such as an engine, a transmission, a gear and the like can be omitted. Accordingly, the transportation device may become lightweight and loss of energy during a process of delivering power can be reduced.

FIG. 1 is a cross-sectional view briefly illustrating an in-wheel motor driving device 10 of the related art.

The in-wheel motor driving device 10 of the related art, as illustrated, comprises a tire 11, a rim 13, a stator 17, a rotor 15 and a shaft 19.

The tire 11 surrounds and wraps an outer wheel of the rim 13 and is coupled to the rim 13, and a motor assembly comprising the stator 17 and the rotor 15 is coupled into the rim 13. The shaft 19 is fixed towards a center of a hub of the stator 17. When electric power is supplied to the stator 17, an electromagnetic force is generated, and the rotor 15 having a permanent magnet rotates outside the stator 17 coupled to the shaft 19. The rim 13 rotates and the tire surrounding and wrapping the rim 13 rotates as the rotor 15 rotates.

The in-wheel motor driving device 10 of the related art in FIG. 1 includes no brake configuration for stopping rotation of the rim 13.

The in-wheel motor driving device of the related art 10 may be provided with a mechanical brake. For the brake of the related art, a friction disc and the like may be attached to the outside of the in-wheel motor driving device 10. In order for the friction disc and the like to be attached to the outside of the in-wheel motor driving device, mechanical components are additionally required and the brake needs repairs and maintenance on a regular basis due to wear on the disc and the like.

An in-wheel motor system is disclosed in Korean Patent Publication No. 10-2014-0132216 (published on Nov. 17, 2014 and referred to as "prior art document 1") as a prior art document relating to the present disclosure. For the in-wheel motor system in prior art document 1, a motor is mounted onto a rim of a wheel of a vehicle to directly drive the wheel. When it comes to the in-wheel motor system applied to a vehicle, an electronic brake is not additionally built into the vehicle. Accordingly, when an external brake is installed, the in-wheel motor system may have a complex structure. Additionally, when a wheel chair and the like stop on a slope, the wheel chair slips backwards against a user's intent. Thus, the in-wheel motor driving device is inappropriate for a wheel chair and the like for safety reasons.

An in-wheel motor for an electric vehicle is disclosed in Korean Patent Publication No. 10-2012-0095721 (published on Aug. 29, 2012 and referred to as "prior art document 2") as another prior art document relating to the present disclosure. The in-wheel motor in prior art document 2 includes a motor for generating rotational power, a speed reducer for delivering rotational power of the motor, a hub installed at the front of the speed reducer, a disc assembled to the hub and a wheel. The in-wheel motor for a vehicle in prior art document 2 is not additionally provided with a brake means therein. Accordingly, an external brake needs to be installed. Thus, the in-wheel motor has a complex structure. Further, a wheel chair and the like, to which the in-wheel motor in prior art document 2 is applied, is inappropriate for preventing safety accidents.

Therefore, required are technical solutions to improve aesthetic qualities through simplification of an appearance and a structure and to prevent a safety accident caused by a backward movement on a slope and the like in case an in-wheel motor driving device is applied to a wheel chair and the like.

DISCLOSURE

Technical Problems

The present disclosure is directed to an electronic brake-integrated in-wheel motor driving device that may ensure simplification of a structure that may be otherwise complex due to an installed brake.

The present disclosure is directed to an electronic brake-integrated in-wheel motor driving device that may ensure prevention of outward exposure of a power supply line for supplying power to the in-wheel motor driving device, a simplified appearance, and a reduction in faults caused by electric contact failure or a cut of cables and the like.

Aspects of the present disclosure are not limited to the above-described ones. Additionally, other aspects and advantages that have not been mentioned can be clearly understood from the following description and can be more clearly understood from embodiments. Further, it will be understood that the aspects and advantages of the present disclosure can be realized via means and combinations thereof that are described in the appended claims.

Technical Solutions

According to one aspect of the present disclosure as a means to achieve one of the objectives, an electronic brake-integrated in-wheel motor driving device, in which an electronic brake is built into an in-wheel motor driving device, may perform a function of braking with no need to install a mechanical brake having a complex structure outside the in-wheel motor driving device.

To this end, the electronic brake-integrated in-wheel motor driving device may comprise a circular rim, an outer wheel of which is surrounded by a tire, which is coupled to the tire, which is provided with a hollow portion therein, through which a shaft passes and to which the shaft is coupled, a motor assembly that comprises a stator inserted into the rim and a rotor disposed to surround and wrap the stator and configured to rotate outside the stator through supply of power, and that is configured to connect to the shaft through a stator hub provided in the stator, an electronic brake disposed to face the motor assembly and operating to stop rotation of the rotor, a brake mounting jig coupled to the stator hub, configured to accommodate the electronic brake, coupled to the electronic brake, provided with a bearing between the brake mounting jig and the rim, a first cover coupled to one side of the rim to seal the motor assembly and support the shaft, and a second cover coupled to the other side of the rim to seal the electronic brake accommodated in the brake mounting jig.

In this case, the shaft may pass through a center of the stator hub and may be coupled to the stator hub in a direction across the rim. The electronic brake may comprise an electronic brake rotor coupled and fixed to the second cover and configured to stop rotating by an electromagnetic force when a braking signal is supplied, and an electronic brake stator configured to face the electronic brake rotor, coupled to the electronic brake rotor through a side opposite to a side of the electronic brake rotor, to which the second cover is coupled, and coupled to the brake mounting jig. The electronic brake rotor may be provided with a coupling for a coupling with the second cover. The electronic brake rotor may be inserted into a circular accommodation groove provided in the second cover, and the coupling may be provided with a coupling hole to which a coupling protrusion is coupled, the coupling protrusion configured to protrude from a center of the accommodation groove in a direction across the second cover. Accordingly, a bearing may be disposed on an outer circumferential surface of the stator of the electronic brake, thereby ensuring a reduction in contact friction at the time of rotation of the rim and ensuring a rapid and accurate stop of rotation of a wheel through a braking force of the electronic brake delivered to the rim through the second cover.

In an embodiment, when no electric current flows through a coil built into the electronic brake stator in the electronic brake, an amateur disposed between the electronic brake stator and the electronic brake rotor may be pushed away by an elastic force of a torque spring provided at one side of the electronic brake stator and rotation of the electronic brake rotor may stop. When electric current flows through the coil built into the electronic brake stator, a force generated in an opposite direction of the torque spring in the amateur becomes greater than an elastic force of the torque spring, and the electronic brake rotor may rotate. As a result, the electronic brake may be integrally built into the in-wheel motor driving device without additional mechanical components for installing a brake, thereby ensuring convenience of maintenance and repairs, and the electronic brake may not be affected by an external impact and a foreign substance, thereby ensuring an increase in the life span and durability.

According to another aspect of the present disclosure as a means to achieve the other objective, a shaft of an in-wheel motor driving device may be provided with a shaft hole formed along a lengthwise direction of the shaft. The shaft hole may be used as a passage for inserting a power supply line. For example, the power supply line may denote a cable connected to supply power to one or more or preferably all of the motor assembly, a Hall sensor installed at the motor assembly and the electronic brake. As described above, the shaft hole may be used as a connection passage of the power supply line, thereby preventing the power supply line from being exposed outwards.

Advantageous Effects

According to the present disclosure, a complex appearance of an in-wheel motor driving device, caused by installation of a brake, may be avoided and a simplified appearance of the wheel chair and the like may be ensured. Accordingly, aesthetic qualities as well as functions may be improved, thereby making it possible to enhance competitiveness of products.

According to the present disclosure, a power supply line for supplying power to an in-wheel motor driving device may be connected through a shaft hole and may be prevented from being exposed outwards, thereby ensuring a reduction in faults caused by electric contact failure or a cut of cables and the like and a simplified appearance.

Detailed effects of the present disclosure are described together with the above-described effects in the detailed description of the disclosure.

DESCRIPTION OF THE DRAWINGS

FIG. 1 is a cross-sectional view briefly illustrating an in-wheel motor driving device of the related art.

FIG. 2 is an exploded perspective view briefly illustrating an in-wheel motor driving device according to an embodiment.

FIG. 3 is a perspective view briefly illustrating a cross section of an in-wheel motor driving device according to an embodiment.

FIG. 4 is a cross-sectional view briefly illustrating an in-wheel motor driving device according to an embodiment.

FIG. 5 is a perspective view briefly illustrating en electronic brake of an in-wheel motor driving device according to an embodiment.

FIG. 6 is a perspective view illustrating a cross section of an electronic brake of an in-wheel motor driving device according to an embodiment.

BEST MODE

Hereinafter, embodiments of the present disclosure are described in detail with reference to the drawings so that those skilled in the art to which the disclosure pertains can easily implement the embodiments. The present disclosure may be implemented in many different forms and is not limited to the embodiments set forth herein.

In order to clearly describe the present disclosure, technical explanation that is not directly related to the disclosure may be omitted, and identical or similar components are denoted by identical reference numerals throughout the specification. Further, some embodiments of the present disclosure are described in detail with reference to the exemplary drawings. In giving reference numerals to the components in each drawing, the same components may be given the same reference numeral as possible even when they are illustrated in different drawings. Further, in describing the present disclosure, detailed description of related known configurations or functions is omitted if it is deemed to make the gist of the present disclosure unnecessarily vague.

In describing the components of the disclosure, when any one component is described as being "connected," "coupled" or "connected" to another component, the component may be directly connected or may be able to be directly connected to another component; however, it is also to be understood that an additional component may be "interposed" between the two components, or the two components may be "connected", "coupled" or "connected" through an additional component.

FIG. 2 is an exploded perspective view briefly illustrating an in-wheel motor driving device according to an embodiment.

Referring to FIG. 2, the in-wheel motor driving device 1000 may comprise a rim 100, a motor assembly 200, a brake mounting jig 300, an electronic brake 400, a first cover 130 and a second cover 150.

The rim 100 may be a circular member that constitutes a wheel. An outer wheel of the rim may be surrounded by a tire and the rim may be coupled to the tire. The rim 100 may be provided with a hollow portion therein, and a shaft 110 may pass through the rim 100 in a direction of a center of the hollow portion and may be coupled to the rim 100.

The motor assembly 200 may be a rotation device including a stator 210 (see FIG. 3) and a rotor 230 (see FIG. 3), and may denote a device for receiving external power and for rotating the rim 100.

The stator 210 (see FIG. 3) may be inserted into the rim through the hollow portion of the rim 100, and the rotor 230 (see FIG. 3) may be disposed to surround and wrap the stator 210 (see FIG. 3) and may be configured to rotate outside the stator 210 by supply of power.

Additionally, the stator 210 (see FIG. 3) therein may be provided with a stator hub 215 (see FIG. 3), and the shaft 110 may connect with the shaft 110 through the stator hub 215 (see FIG. 3).

The brake mounting jig 300 may accommodate the electronic brake 400 and may be coupled to the electronic brake 400, and may also be coupled to the stator hub 215 (see FIG. 3) through a side opposite to a coupling direction of the electronic brake 400.

To this end, the brake mounting jig 300 may comprise a jig main body 310 that may insert and fix the electronic brake stator 430 through one end of the brake mounting jig 300.

Additionally, a circular projection 311 coupled to the stator hub 215 (see FIG. 3) may be further provided at the other end of the brake mounting jig 300, specifically, at the other end of the jig main body 310.

A bearing 320 may be further provided at a portion where the brake mounting jig 300 and the electronic brake 400 are coupled, and a plurality of ball bearings 320 may be disposed in a circumferential direction along an edge of the brake mounting jig 300.

The electronic brake 400 may be spaced apart from the motor assembly 200 and disposed to face the same including the rotor 230 (see FIG. 3) configured to receive external power and rotate.

The electronic brake 400, disposed as described above, may stop rotation of the rotor 230 (i.e., brake the rotor) (see FIG. 3) of the motor assembly 200.

The first cover 130 may seal one side (e.g., a front side and the like) of the motor assembly 200. Further, the first cover 130 may offer a function of supporting the shaft 110.

To this end, the first cover 130 may be coupled to a wheel, specifically one side (e.g., the front side and the like) of the rim 100.

The second cover 150 may seal the electronic brake 400 accommodated in the brake mounting jig 300. To this end, the second cover 150 may be coupled to the wheel, specifically, the other side (e.g., the rear side and the like) of the rim 100.

Specifically, the second cover 150 may be provided with a circular accommodation groove 151 therein, and a rotor 410 (see FIG. 3) of the electronic brake 400 may be inserted through the accommodation groove 151 of the second cover 150.

In this case, a coupling 411 (see FIG. 3) provided in the electronic brake rotor 410 (see FIG. 3) may have a coupling hole 490, and a coupling protrusion 153 protruding from a center of the accommodation groove 151 of the second cover 150 may pass through the coupling hole 490 and may be coupled to the coupling hole 490.

Next, a coupling relationship between components included in the electronic brake-integrated in-wheel motor driving device 100 of the present disclosure is described with reference to FIGS. 3 and 4.

FIG. 3 is a perspective view briefly illustrating a cross section of an in-wheel motor driving device according to an embodiment, and FIG. 4 is a cross-sectional view briefly illustrating an in-wheel motor driving device according to an embodiment.

Referring to FIGS. 3 and 4, a rim 100 may denote a circular rigid member that constitutes a wheel, and may be provided with a hollow portion having a predetermined size therein. A shaft 110 and a motor assembly 200 may be inserted such that the shaft 110, the motor assembly 200 and the rim 100 have the same center.

The motor assembly 200 may comprise a stator 210 and a rotor 230. The stator 210 may be inserted into the rim 100, and the rotor 230 may be rotatably coupled outside the stator 210 to surround and wrap the stator 210. In this case, the stator 210 may be provided with a stator hub 215 therein, and the shaft 110 may pass through a center of the stator hub 215 and may be coupled to the stator hub 215.

For example, the stator 210 may comprise a core where a plurality of poles wound by a coil is formed, and the rotor 230 may comprise a magnet (e.g., a permanent magnet). Accordingly, when electric current is supplied to the stator 210 and an electromagnetic force is generated, the rotor 230 may rotate outside the stator 210. In this case, the stator 210 may be fixed to the shaft 110 through the stator hub 215 without rotating, and the rotor 230 may rotate outside the stator 210 along with the rim 100.

Additionally, an electronic brake 400 may stop rotation of the rotor 230. The electronic brake 400 may be spaced apart from the motor assembly 200 to face the same.

The electronic brake 400 may comprise components such as an electronic brake rotor 410 and an electronic brake stator 430 and the like. A detailed configuration of the electronic brake 400 is described with reference to FIGS. 5 and 6 hereunder.

A brake mounting jig 300 may be disposed between the motor assembly 200 and the electronic brake 400. The brake mounting jig 300 may be provided with a jig main body 310 that has an insertion groove corresponding to the electronic brake stator 430 such that the stator 430 of the electronic brake 400 is inserted and fixed. Additionally, a circular projection 311 may be provided through a side opposite to the side of the brake mounting jig 300 into which the electronic brake stator 430 is inserted, and the circular projection 311 may be coupled to the stator hub 215.

Further, a plurality of bearings 320 may be disposed on an outer circumferential surface of the brake mounting jig 300 in a radial direction, and specifically, may be formed between the brake mounting jig 300 and the rim 100 to contact the rim 100 such that friction between the brake mounting jig 300 and the rim 100 is reduced when the rim 100 rotates.

The electronic brake 400 may comprise the electronic brake rotor 410 fixed to a second cover 150 and configured to rotate and the electronic brake stator 430 coupled to the jig main body 310 of the brake mounting jig 300 and fixed to the shaft 110. In case a braking signal is supplied to the electronic brake rotor 410, rotation of the electronic brake rotor 410 may stop and rotation of the second cover 150 and the rim 100 may stop.

The electronic brake rotor 410 may be accommodated in and coupled to an accommodation groove 151 of the second cover 150, and a coupling 411 may be coupled and fixed to a coupling protrusion 153 of the second cover 150.

Referring to FIG. 4, one end of the shaft 110 (i.e., the right end of the shaft 110 in FIG. 4) may pass through and be inserted into a center of a first cover 130, and the other end of the shaft 110 (i.e., the left end of the shaft 110 in FIG. 4) may have a shape the outer diameter of which extends further than an outer diameter of one end.

Specifically, a first outer diameter extended portion 111 having an outer diameter extended to correspond to a diameter of a hole of the stator hub 215 and a second outer diameter extended portion 113 having an outer diameter larger than that of the first outer diameter extended portion 111 may be provided at the other end of the shaft 110.

In this case, the second outer diameter extended portion 113 may have an outer diameter larger than the diameter of the hole of the stator hub 215. Accordingly, when the shaft 110 is inserted into and connected to the stator hub 215, the shaft 110 may be fixed and prevented from escaping due to a difference between the diameters of the shaft 110 and the stator hub 210.

Referring to FIG. 4, the shaft 110 may have a hole (referred to as "shaft hole 110a" that is formed along a lengthwise direction of the shaft.

The shaft hole 110a may be used as a passage for inserting a power supply line 500 into the in-wheel motor driving device 1000 such that electric cables are prevented from being exposed outside of the wheel, thereby making it possible to provide a simplified appearance to the in-wheel motor driving device. Further, the power supply line 500 may be connected through the shaft hole 110a, thereby preventing damage, wear, a cut and the like of the electric cables and reducing an electric fault and defect, caused by outward exposure of the cables.

The power supply line 500 may be an electric cable that supplies power to the stator 210 of the above-described motor assembly 200.

In addition, the power supply line 500 may be an electric cable that supplies power to a Hall sensor installed in the motor assembly 200 and configured to detect a magnetic force of a magnet and to the electronic brake 400.

Next, a configuration and operations of an electronic brake of the in-wheel motor driving device according to an embodiment are described.

FIG. 5 is a perspective view briefly illustrating en electronic brake of an in-wheel motor driving device according to an embodiment, and FIG. 6 is a perspective view illustrating a cross section of an electronic brake of an in-wheel motor driving device according to an embodiment.

Referring to FIG. 5, the electronic brake 400 may comprise a circular plate-shaped electronic brake rotor 410 that is provided with a coupling 411 therein and that is configured to rotate, and an electronic brake stator 430 disposed to face the electronic brake rotor 410, having a circular plate shape corresponding to the circular plate shape of the electronic brake rotor 410, and fixed and coupled to the electronic brake rotor 410.

The coupling 411 may be coupled to a second cover 150 (see FIG. 3). Accordingly, the electronic brake rotor 410 may rotate along with the second cover 150 (see FIG. 3) connected with a rim 100 (see FIG. 3) or may stop rotating through supply of a braking signal.

Referring to FIG. 6, a coil may be built into the stator 430 of the electronic brake 400, and a torque spring 440 may be provided at the stator 430 of the electronic brake 400 in a direction where the torque spring 440 pushes the electronic brake rotor 410.

In case no electric current flows through the coil built into the electronic brake stator 430 in the electronic brake 400, an amateur 450 disposed between the electronic brake stator 430 and the electronic brake rotor 410 may be pushed by an elastic force of the torque spring 440 provided at the electronic brake stator 430. As such, rotation of the electronic brake rotor 410 may stop. Accordingly, a second cover 150 (see FIG. 3) coupled to the electronic brake rotor 410 may stop rotating, and the rim 100 (see FIG. 3) connected to the second cover 150 (see FIG. 3) may stop rotating. Thus, the in-wheel motor driving device may be braked.

In case electric current flows through the coil built into the electronic brake stator 430 in the electronic brake 400, a force may be generated in an opposite direction of an elastic force of the torque spring 440 in the amateur 450. In this case, the force generated in the amateur 450 may be greater than the elastic force of the torque spring 440. As such, the electronic brake rotor 410 may keep rotating. Thus, the second cover 150 (see FIG. 3) and the rim 100 (see FIG. 3) that are coupled to the electronic brake rotor 410 may keep rotating through a rotational force of the rotor 230 (see FIG. 3) without stopping.

With the above-described configurations and operations in the present disclosure, a complex appearance of the in-wheel motor driving device, caused by installation of a brake, may be avoided and a simplified appearance of a wheel chair and the like may be ensured. Accordingly, aesthetic qualities as well as functions of a wheel chair product to which the in-wheel motor driving device is applied may be improved, thereby making it possible to enhance competitiveness of the products.

Further, when the in-wheel motor driving device is applied to a wheel chair, the wheel chair may be prevented from slipping and moving backwards due to its self weight on a slope and the like against a user's intent, and a safety accident of the user may be prevented.

The present disclosure has been described with reference to the embodiments illustrated in the drawings. However, the disclosure is not limited to the embodiments and the drawings set forth herein. Further, various modifications may be made by one having ordinary skill in the art within the scope of the technical spirit of the disclosure. Further, though not explicitly described during the description of the embodiments of the disclosure, effects and predictable effects based on the configuration of the disclosure should be included in the scope of the disclosure.

The invention claimed is:

1. An electronic brake-integrated in-wheel motor driving device, comprising:
    a circular rim, an outer wheel of which is surrounded by a tire, which is coupled to the tire, which is provided with a hollow portion therein, through which a shaft passes and to which the shaft is coupled;
    a motor assembly that comprises a stator inserted into the rim, and a rotor disposed to surround and wrap the stator and configured to rotate outside the stator through supply of power, and that connects to the shaft through a stator hub provided in the stator;
    an electronic brake disposed to face the motor assembly and operating to stop rotation of the rotor;
    a brake mounting jig coupled to the stator hub, configured to accommodate the electronic brake, coupled to the electronic brake and provided with a bearing between the brake mounting jig and the rim;

a first cover coupled to one side of the rim to seal the motor assembly and to support the shaft; and a second cover coupled to the other side of the rim to seal the electronic brake accommodated in the brake mounting jig, the electronic brake, comprising:

an electronic brake rotor coupled and fixed to the second cover, and configured to stop rotating by an electromagnetic force when a braking signal is supplied; and an electronic brake stator configured to face the electronic brake rotor, coupled to the electronic brake rotor through a side opposite to the side of the electronic brake rotor, to which the second cover is coupled, and coupled to the brake mounting jig, wherein the electronic brake rotor is provided with a coupling for a coupling with the second cover, and the electronic brake rotor is inserted into a circular accommodation groove provided in the second cover.

2. The driving device of claim 1, wherein the shaft passes through a center of the stator hub and is coupled to the stator hub in a direction across the rim.

3. The driving device of claim 1, wherein the coupling is provided with a coupling hole through which a coupling protrusion passes and to which the coupling protrusion is coupled, the coupling protrusion configured to protrude from a center of the accommodation groove in a direction across the second cover.

4. The driving device of claim 1, wherein no electric current flows through a coil built into the electronic brake stator in the electronic brake, an amateur disposed between the electronic brake stator and the electronic brake rotor is pushed away by an elastic force of a torque spring provided at one side of the electronic brake stator and the electronic brake rotor stops rotating.

5. The driving device of claim 1, wherein electric current flows through a coil built into the electronic brake stator in the electronic brake, a force generated in an opposite direction of the torque spring in the amateur becomes greater than an elastic force of the torque spring, and the electronic brake rotor rotates.

6. The driving device of claim 1, wherein a jig main body having an insertion groove configured to insert and fix the electronic brake stator is provided at one end of the brake mounting jig.

7. The driving device of claim 6, wherein a circular projection is provided at an opposite end of the brake mounting jig, the circular projection configured to protrude towards the stator hub and coupled to the stator hub.

8. The driving device of claim 1, wherein one end of the shaft passes through a center of the first cover and is inserted into the first cover, and an opposite end of the shaft has a shape, an outer diameter of which extends further than an outer diameter of the one end of the shaft.

9. The driving device of claim 8, wherein the other end of the shaft comprises a first outer diameter extended portion, an outer diameter of which extends to correspond to a hole of the stator hub, and a second outer diameter extended portion having an outer diameter larger than the outer diameter of the first outer diameter extended portion.

10. The driving device of claim 9, wherein the second outer diameter extended portion is fixed to the stator hub and is prevented from escaping.

11. The driving device of claim 1, wherein the shaft is provided with a shaft hole formed along a lengthwise direction thereof.

12. The driving device of claim 11, wherein the shaft hole is used as a passage for inserting a power supply line.

13. The driving device of claim 12, wherein the power supply line connects to supply power to one or more of the motor assembly, a Hall sensor installed in the motor assembly and the electronic brake.

14. An electronic brake-integrated in-wheel motor driving device, comprising:

a circular rim, an outer wheel of which is surrounded by a tire, which is coupled to the tire, which is provided with a hollow portion therein, through which a shaft passes and to which the shaft is coupled;

a motor assembly that comprises a stator inserted into the rim, and a rotor disposed to surround and wrap the stator and configured to rotate outside the stator through supply of power, and that connects to the shaft through a stator hub provided in the stator;

an electronic brake disposed to face the motor assembly and operating to stop rotation of the rotor;

a brake mounting jig coupled to the stator hub, configured to accommodate the electronic brake, coupled to the electronic brake and provided with a bearing between the brake mounting jig and the rim;

a first cover coupled to one side of the rim; and a second cover coupled to the other side of the rim to seal the electronic brake accommodated in the brake mounting jig, the electronic brake, comprising:

an electronic brake rotor coupled and fixed to the second cover and configured to stop rotating by an electromagnetic force when a braking signal is supplied; and an electronic brake stator disposed to face the electronic brake rotor, coupled to the electronic brake rotor through a side opposite to the side of the electronic brake rotor, to which the second cover is coupled, and coupled to the brake mounting jig, wherein the electronic brake rotor is provided with a coupling for a coupling with the second cover, and the electronic brake rotor is inserted into a circular accommodation groove provided in the second cover.

15. The driving device of claim 14, wherein the coupling is provided with a coupling hole through which a coupling protrusion passes and to which the coupling protrusion is coupled, the coupling protrusion configured to protrude from a center of the accommodation groove in a direction across the second cover.

16. The driving device of claim 14, wherein a jig main body having an insertion groove for inserting and fixing the electronic brake stator is provided at one end of the brake mounting jig.

17. The driving device of claim 16, wherein a circular projection protruding towards the stator hub and coupled to the stator hub is provided at the other end of the brake mounting jig.

* * * * *